United States Patent [19]
Atwal et al.

[11] 3,846,417
[45] Nov. 5, 1974

[54] 1,4-CYCLOHEXADIENYL IMIDAZOLIDINYL CEPHALOSPORANIC ACIDS AND DERIVATIVES THEREOF

[75] Inventors: Manmohan Singh Atwal, Somerset; Daniel Jay Watts, Lawrenceville; Frank Lee Weisenborn, Titusville, all of N.J.

[73] Assignee: E. R. Squibb & Sons, Inc., Princeton, N.J.

[22] Filed: June 23, 1972

[21] Appl. No.: 265,874

[52] U.S. Cl. .............................. 260/243 C, 424/246
[51] Int. Cl. ............................................. C07d 99/24
[58] Field of Search ................................ 260/243 C

[56] References Cited
UNITED STATES PATENTS

| | | | |
|---|---|---|---|
| 3,198,804 | 8/1965 | Johnson et al. | 260/239.1 |
| 3,485,819 | 12/1969 | Weisenborn et al. | 260/243 C |
| 3,714,146 | 1/1973 | Gottstein et al. | 260/243 C |

*Primary Examiner*—Nicholas S. Rizzo
*Attorney, Agent, or Firm*—Lawrence S. Levinson; Merle J. Smith; Stephen B. Davis

[57] ABSTRACT

7-[4-(1,4-Cyclohexadienyl and 1,4-cyclohexadienylalkyl)-5-oxo(thio)-1-imidazolidinyl]-$\Delta^3$-cephem-4-carboxylic acids and derivatives thereof are disclosed. In addition, processes for preparing and using these antimicrobial agents are reported.

8 Claims, No Drawings

1,4-CYCLOHEXADIENYL IMIDAZOLIDINYL CEPHALOSPORANIC ACIDS AND DERIVATIVES THEREOF

BACKGROUND OF THE INVENTION

Since the discovery of penicillin, researchers have carried out an intense search in order to obtain other new useful antibiotics. In addition, the useful antibiotics have been altered by chemists to give what is generally termed a semi-synthetic antibiotic with the hope of enhancing the properties of the molecule.

More recently a new group of broad spectrum antibiotics has been reported which are generally termed cephalosporins. Considerable molecular modification of the natural cephalosporins has been reported resulting in a number of improved antibiotics being formed. One of special interest has the following formula (U.S. Pat. No. 3,485,819):

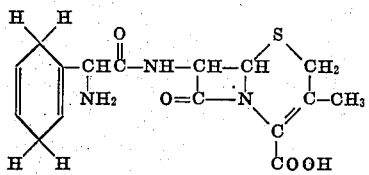

The present invention reports compounds that optimize the stability and duration of activity of molecules of the above general type.

SUMMARY OF THE INVENTION

This invention relates to compounds of the following general formula:

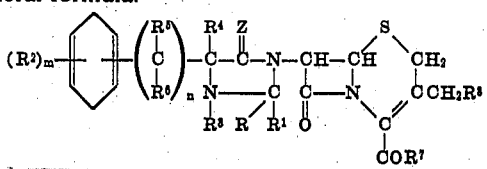

wherein Z is oxygen or sulfur, $R^1$ and R are hydrogen, lower alkyl, aryl, aryl lower alkyl, halo lower alkyl, heterocyclic, such as 2 or 3-thienyl, 2 or 3-furyl, $\alpha,\beta$ or $\gamma$-pyridyl and wherein $RR^1C$ taken together form carbocyclic rings of three to seven carbon atoms and heterocyclic rings such as those derived from N-methyl-2-ketopiperidine, 6-keto-1,3-dioxane, 2-ketotetra-N-methyl-ketopyrrolidine, 2-ketotetrahydrofuran, 2-ketotetrahydrothiophene, 2-ketodihydroindoline, 2-ketodihydrobenzofuran, etc.; $R^2$ is hydrogen, lower alkyl, or lower alkoxy; $m$ is one or two; $R^3$ to $R^6$ are hydrogen or lower alkyl; $n$ is an integer from 0 to 4; $R^7$ is hydroxy, amino, lower alkyl substituted amino such as $NHCH_3$ or $N(CH_3)_2$ and lower alkyloxy or

taken together is a carboxylate salt such as the alkali metal salt (sodium or potassium); the alkaline earth salt, (calcium or magnesium) or that of an organic base such as dibenzylamine, N,N-dibenzylethylenediamine, procaine, etc.; and $R^8$ is hydrogen, hydroxy, lower alkanoyloxy, aroyloxy, aralkanoyloxy, the radical of a nitrogen base, a quaternary ammonium radical or $R^7$ and $R^8$ taken together represent the oxygen of a five membered lactone or a methyleneoxy of a six membered lactone.

The term lower alkyl and lower alkoxy in the above formulas represent groupings of from one to six carbon atoms which include straight and branched chain fragments, such as methyl, ethyl, isopropyl, tert-butyl, methoxy, ethoxy, iso-propoxy and tert-butoxy. Where the term alkyl is incorporated into a broader term such as aralkanoyloxy, the segment "alkan" is again intended to mean one to six carbon atoms which includes straight or branched chains.

The term aryl represents phenyl, $\gamma$-napthyl, $\beta$-napthyl, halophenyl, lower alkyl or lower alkoxysubstituted phenyl and halolower alkylphenyl.

In addition, a method for preparing said structures, useful pharmaceutical compositions containing said structures and methods for using said compositions are disclosed.

The novel compounds of this invention are prepared by the following reaction:

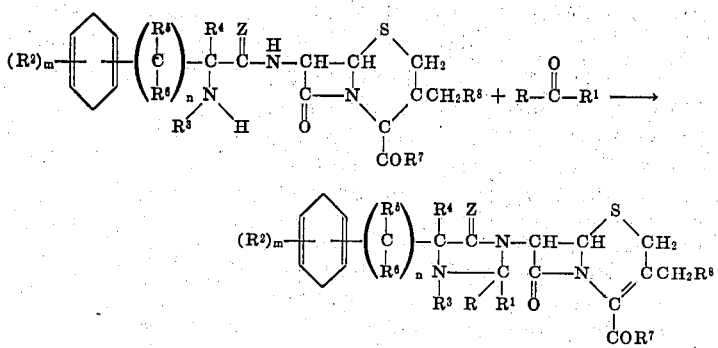

wherein Z, m, n and $R^2$ to $R^8$ are as previously described.

is intended to represent a carbonyl compound wherein R and $R^1$ are as described earlier or a cyclic ketone having three to seven carbon atoms such as cyclopropanone, cyclopentanone and cycloheptanone, or a heterocyclic ring system, such as 3-ketopiperidine, 4-ketopiperidine, and 3-ketotetrahydrofuran and 3-ketotetrahydrothiophene.

The reaction forming the compounds of this invention takes place with relative ease. Standard solvents and solvent mixtures may be employed having at least a trace of water present (over 0.1 percent), such as $CHCl_3$ or $CH_2Cl_2$. The reaction is to be carried out in a slightly basic medium. If very reactive carbonyl compounds are employed, the basic nature of the cephalosporin fragment may be adequate to promote cyclization. However, if less reactive carbonyl compounds are used, a base may be employed to promote the reaction, such as NaOH, KOH, $(C_2H_5)_3N$, $p\text{-}CH_3OC_6H_4NH_2$, and $C_6H_5CH_2N(CH_3)_2$. The temperature range employed for most reactions of this type is from about room temperature to 55°C for a period of from about 1 to about 12 hours. Lower temperatures may be employed; however, the time of reactions becomes unreasonably long. Higher temperatures may also be employed but considerable decomposition may accompany the reaction.

The preferred structures of the present invention have the formula:

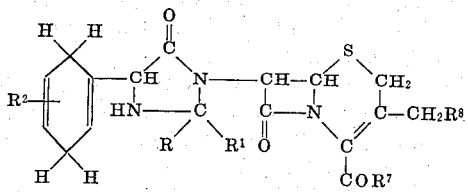

with the most preferred embodiment being one wherein $R^7$ is hydroxy or a pharmaceutically acceptable salt thereof; $R^8$ is hydrogen, hydroxy and acetoxy; $R^1$ and R are hydrogen, lower alkyl or taken together form a ring system of three to seven carbon atoms and $R^2$ is hydrogen and lower alkyl.

It will be appreciated that the compounds of this invention exist in different optically active forms. All of the various diastereoisomeric forms are intended to be within the scope of this invention. In the preferred structures, the D form of the 7-acylamino group is generally favored.

The compounds of this invention possess stability and duration of activity characteristics which are superior to the non-cyclized analogues, and find utility in treating infections in mammals, such as dogs, cats, cattle, etc., caused by either gram positive or gram negative organisms, such as *Staphylococcus aureus, Salmonella schottmuelleri, Pseudomonas aeruginosa, Proteus vulgaris, Escherichia coli* and *Streptococcus pyogenes.* They may be used as antibacterial agents in a prophylactic manner, e.g., in cleaning or disinfecting compositions, or otherwise to combat infections due to organisms such as those named above, and in general may be utilized in a manner similar to the other cephalosporins. For example, compounds of this invention may be used in various animal species in an amount of about 0.1 to 100 mg/kg daily, orally or parenterally, in single or two to four divided doses to treat infections of bacterial origin. Up to about 1.0 g of a compound of this invention may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 5 percent by weight of such compounds admixed with, suspended or dissolved in conventional inert dry or aqueous carriers for application by washing or spraying may be used.

The following examples are illustrative of the invention.

EXAMPLE 1

The preparation of 7-[4-(1,4-cyclohexadien-1-yl)-5-oxo-2,2-bistrifluoromethyl-1-imidazolidinyl]-3-methyl-$\Delta^3$-cephem-4-carboxylic acid.

7-($\alpha$-amino-$\alpha$-1,4-cyclohexadien-2-ylacetamido)-3-methyl-3-cephem-4-carboxylic acid (2.0 g, 0.00545 moles) was mixed with 100 ml of chloroform forming a thin slurry. To the mixture was added 2.12 g (0.0109 moles) of hexafluoroacetone monohydrate and the reaction solution was stirred for 2 days. The reaction mixture gradually thickened until stirring was no longer possible. The final slurry was filtered under reduced pressure and the collected solid washed with 50 ml of chloroform. The product was dried at room temperature under reduced pressure yielding 2.39 g (88.3 percent) of a tan powder, decomp. 144°, m.p. 220°. The formation of an imidazolidinone ring is supported by the infrared spectrum (KBr pellet) which showed the appearance of a shoulder absorption at 1,740 cm$^{-1}$ indicative of a $\delta$lactam carbonyl and of a strong peak at 1215 cm$^{-1}$ indicative of C-F bonds, together with the disappearance of amide II absorption at 1550 cm$^{-1}$.

EXAMPLE 2

The preparation of 7-[4-(1,4-cyclohexadien-1-yl)-5-oxo-2-trichloromethyl-1-imidazolidinyl]-3-methyl-$\Delta^3$-cephem-4-carboxylic acid.

7-($\alpha$-amino-$\alpha$-1,4-cyclohexadien-2-ylacetamido)-3-methyl-3-cephem-4-carboxylic acid (2.0 g, 0.00545 moles) was mixed with 100 ml of chloroform; stirring was begun, forming a thin slurry. A 1.9 g (0.0109 mole) portion of chloral hydrate was added to the mixture and the reaction was stirred for 2 days, whereupon it became so thick that further stirring was impossible. The solid was filtered, washed with 50 ml of chloroform, and dried at room temperature under reduced pressure yielding 2.1 g (80.2 percent) of a white solid, decomp. 148°, m.p. 235°. The formation of an imidazolidinone ring is supported by the infrared spectrum (KBr pellet) which showed the appearance of a shoulder absorption at 1735 cm$^{-1}$ indicative of a $\Delta$-lactam carbonyl and of a strong absorption at 815 cm$^{-1}$ indicative of C-N or C-Cl bonds together with the disappearance of amide II absorption at 1550 cm$^{-1}$.

EXAMPLE 3

Preparation of 7-[4-(1,4-cyclohexadien-1-yl)-5-oxo-2,2-dimethyl-1-imidazolidinyl]-3-methyl-$\Delta^3$-cephem-4-carboxylic acid.

The reaction is carried out in a manner similar to that of example 1 except that a large excess of acetone is employed in place of the hexafluoroacetone and a small quantity of aqueous 5% KOH is added to promote the reaction.

EXAMPLE 4

Preparation of a capsule formulation

| Ingredient | mg/capsule |
|---|---|
| 7-[4-(1,4-cyclohexadien-1-yl)-5-oxo-2,2-dimethyl-1-imidazolidinyl]-3-methyl-$\Delta^3$-cephem-4-carboxylic acid | 300 |
| Starch | 80 |
| Magnesium stearate | 5 |

The active ingredient, starch and magnesium stearate are blended together. The mixture is used to fill hard shell capsules of a suitable size at a fill weight of 385 mg. per capsule.

EXAMPLE 5

Preparation of a tablet formulation

| Ingredient | mg/tablet |
|---|---|
| 7-[4-(1,4-cyclohexadien-1-yl)-5-oxo-2,2-dimethyl-1-imidazolidinyl]-3-methyl-$\Delta^3$-cephem-4-carboxylic acid | 200 |
| Lactose | 200 |
| Corn starch (for mix) | 50 |
| Corn starch (for paste) | 50 |
| Magnesium stearate | 6 |

The active ingredient, lactose and corn starch (for mix) are blended together. The corn starch (for paste) is suspended in water at a ratio of 10 grams of corn starch per 80 ml of water and heated with stirring to form a paste. This paste is then used to granulate the mixed powders. The wet granules are passed through a No. 8 screen and dried at 120°F. The dry granules are passed through a No. 16 screen. The mixture is lubricated with magnesium stearate and compressed into tablets in a suitable tableting machine. Each tablet contains 200 milligrams of active ingredient.

EXAMPLE 6

Preparation of an oral syrup formulation

| Ingredient | Amount |
| --- | --- |
| 7-[4-(1,4-cyclohexadien-1-yl)-5-oxo-2,2-dimethyl-1-imidazolidinyl]-3-methyl-Δ³-cephem-4-carboxylic acid | 5,000 mg |
| Sorbitol solution (70% N.F.) | 40 ml |
| Sodium benzoate | 150 mg |
| Saccharin | 10 mg |
| Red dye (F.D. and C. No. 2) | 10 mg |
| Cherry flavor | 50 mg |
| Distilled water q.s. | 100 ml |

The sorbitol solution is added to 40 milliliters of distilled water and the active ingredient is suspended therein. The saccharin, sodium benzoate, flavor and dye are added and dissolved in the above solution. The volume is adjusted to 100 ml with distilled water.

Other ingredients may replace those listed in the above formulations. For example, a suspending agent such as bentonite magnum, tragacanth, carboxymethylcellulose, or methylcellulose may be used. Phosphates, citrates or tartrates may be added as buffers. Preservatives may include the parabens, sorbic acid and the like and other flavors and dyes may be used in place of those listed above.

EXAMPLE 7

| Ingredient | Injectable Formulation | Amount |
| --- | --- | --- |
| 7-[4-(1,4-cyclohexadien-1-yl)-5-oxo-2,2-dimethyl-1-imidazolidinyl]-3-methyl-Δ³-cephem-4-carboxylic acid, sterile | | 2 part |
| Sodium carbonate anhydrous sterile | | 1 part |

The dry powders are blended and filled aseptically into vials and reconstituted with sterile water for injection prior to use. The resulting solution may be used intravenously or intramuscularly.

What is claimed is:

1. The compounds of the formula

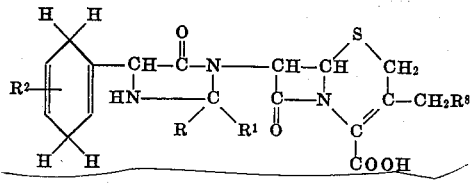

and pharmaceutically acceptable salts thereof; wherein $R^8$ is hydrogen, hydroxy or acetoxy; R and $R^1$ each is hydrogen, lower alkyl or taken together form a three to seven carbon ring; and $R^2$ is hydrogen or lower alkyl.

2. The compounds of claim 1 wherein $R^2$ is hydrogen.

3. The compound of claim 1 wherein $R^2$ and $R^8$ each is hydrogen and R and $R^1$ each is methyl.

4. The compound having the name 7-[4-(1,4-cyclohexadien-1-yl)-5-oxo-2,2-bistrifluoromethyl-1-imidazolidinyl]-3-methyl-Δ³-cephem-4-carboxylic acid.

5. The compound having the name 7-[4-(1,4-cyclohexadien-1-yl)-5-oxo-2-trichloromethyl-1-imidazolidinyl]-3-methyl-Δ³-cephem-4-carboxylic acid.

6. The compounds of claim 2 wherein $R^8$ is hydrogen.

7. The compounds of claim 2 wherein R and $R^1$ are methyl.

8. The D form of the compounds of claim 7.

* * * * *

UNITED STATES PATENT OFFICE
CERTIFICATE OF CORRECTION

Patent No. 3,846,417      Dated November 5, 1974

Inventor(s) Manmohan S. Atwal, Daniel J. Watts, Frank Lee Weisenborn

It is certified that error appears in the above-identified patent and that said Letters Patent are hereby corrected as shown below:

Column 4, line 27, "$\Delta$-lac-" should read -- $\delta$-lac- --.

Signed and sealed this 14th day of January 1975.

(SEAL)
Attest:

McCOY M. GIBSON JR.       C. MARSHALL DANN
Attesting Officer      Commissioner of Patents